(12) United States Patent
Daniel

(10) Patent No.: US 9,262,422 B1
(45) Date of Patent: Feb. 16, 2016

(54) SYSTEM AND METHOD OF VERIFYING A PAYMENT CARDHOLDER'S IDENTITY USING AN INTERACTIVE PAYMENT CARD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 14/185,750

(22) Filed: Feb. 20, 2014

Related U.S. Application Data

(60) Provisional application No. 61/767,082, filed on Feb. 20, 2013.

(51) Int. Cl.
*G06K 5/00* (2006.01)
*G06F 17/30* (2006.01)
*G06K 19/077* (2006.01)

(52) U.S. Cl.
CPC .... *G06F 17/30047* (2013.01); *G06K 19/07707* (2013.01)

(58) Field of Classification Search
CPC .. G06K 5/00; G06Q 20/363; G06Q 20/40145
USPC .................................................. 235/380, 492
See application file for complete search history.

(56) References Cited

U.S. PATENT DOCUMENTS

| | | | |
|---|---|---|---|
| 6,229,964 B1 * | 5/2001 | Bell | 396/310 |
| 8,596,523 B2 * | 12/2013 | Murray et al. | 235/375 |
| 2003/0046693 A1 * | 3/2003 | Billmaier et al. | 725/39 |
| 2013/0117181 A1 * | 5/2013 | Isaacson et al. | 705/41 |
| 2013/0211970 A1 * | 8/2013 | Glass et al. | 705/27.1 |

* cited by examiner

*Primary Examiner* — Seung Lee
(74) *Attorney, Agent, or Firm* — Carol N. Green Kaul, Esq.

(57) ABSTRACT

The present invention relates generally to a system and method of interactive verification of a payment card user's identity. Specifically, by using an electronic payment card with a coded frame displayed thereon that includes one or more hot corners with one or more hyperlinks or icons embedded within the coded frame, activated for display when image capturing means scans the coded frame. Upon activation, a hyperlink or icon may be engaged for controlling interactive multimedia content pursuant to a control command associated with the one icon or hyperlink. The multimedia content may include authenticating information, e.g. security questions, a photograph and the like. Because the interactive multimedia content is not visible prior to the coded frame being scanned and the icons or hyperlinks in any one hot corner being engaged for retrieving the multimedia content, the payment card has varied layers of securitization of the information stored thereon.

20 Claims, 9 Drawing Sheets

SYSTEM AND METHOD OF VERIFYING A PAYMENT CARDHOLDER'S IDENTITY USING AN INTERACTIVE PAYMENT CARD

PRIORITY CLAIM

The present application claims priority to, and is a Continuation in Part of U.S. Provisional Patent Application Ser. No. 61/767,082 titled: "A System And Method Of Interactive Verification of Payment Card User's Identity," filed Feb. 20, 2013. The entire disclosure of said patent application is incorporated herein by reference.

FIELD OF THE INVENTION

The present invention relates generally to a system and method of interactive verification of a payment card user's identity. Specifically, by using an electronic payment card with a coded frame displayed thereon that includes one or more hot corners with one or more hyperlinks or icons embedded within the coded frame, activated for display when image capturing means scans the coded frame. Upon activation, a hyperlink or icon may be engaged for controlling interactive multimedia content pursuant to a control command associated with the one icon or hyperlink. The multimedia content may include authenticating information, e.g. security questions, a photograph and the like. Because the interactive multimedia content is not visible prior to the coded frame being scanned and the icons or hyperlinks in any one hot corner being engaged for retrieving the multimedia content, the payment card has varied layers of securitization of the information stored thereon.

DESCRIPTION OF THE PRIOR ART

To prevent fraud, credit card providers have implemented identity verification procedures to ensure that the cardholder is indeed authorized to use the payment card for payment transactions. For example, online transactions now require the payment card's security code to be entered in online transactions in order to complete the transaction, whereas previously, the security code was not required. Additionally, depending on the type of transaction and/or the amount, the cardholder may be required to provide secondary identity verification documents, e.g. a driver's license, or to provide intimate details concerning the cardholder's identity, e.g. birth year, in a public setting. Thus, there needs to be an efficient system and method for verification of a payment card user's identity in a manner that is efficient and effective while maintaining the privacy of the cardholder. This invention satisfies these long felt needs in a new and novel manner and solves the foregoing problems that the prior art has been unable to resolve.

For a further and more fully detailed understanding of the present invention, various objects and advantages thereof, reference is made to the following detailed description and the accompanying drawings.

Additional objectives of the present invention will appear as the description proceeds. The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1A:
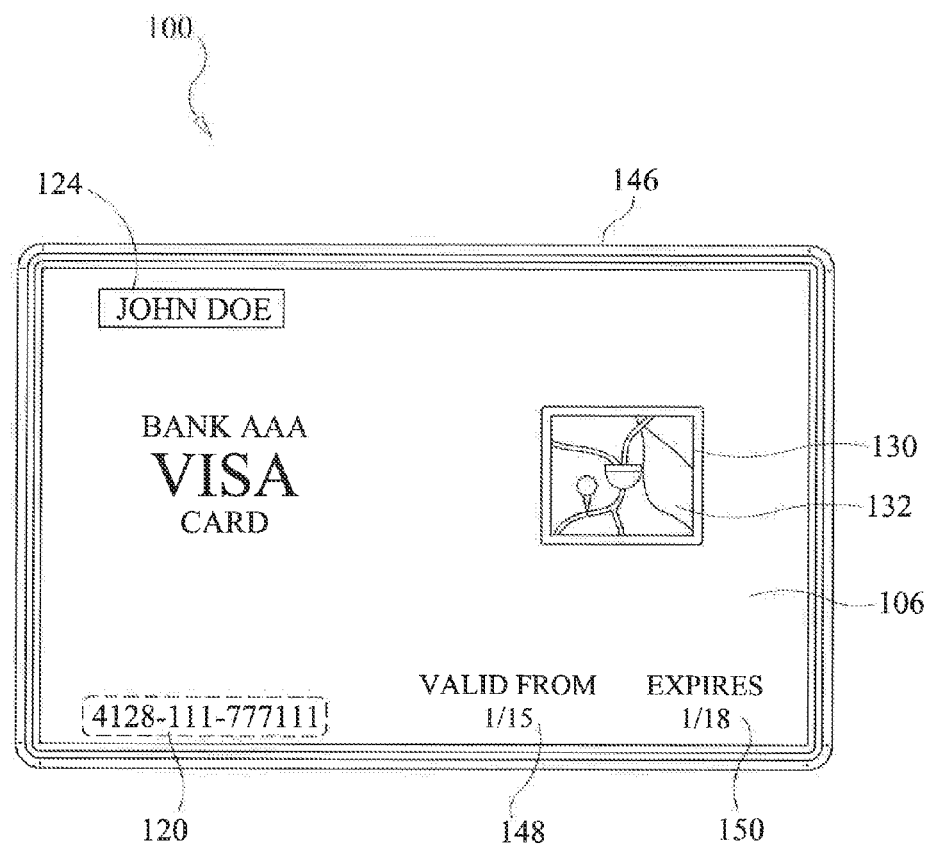
FIGS. 1A-1C are exemplary embodiments of the apparatus of the invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus

Figure 1B:
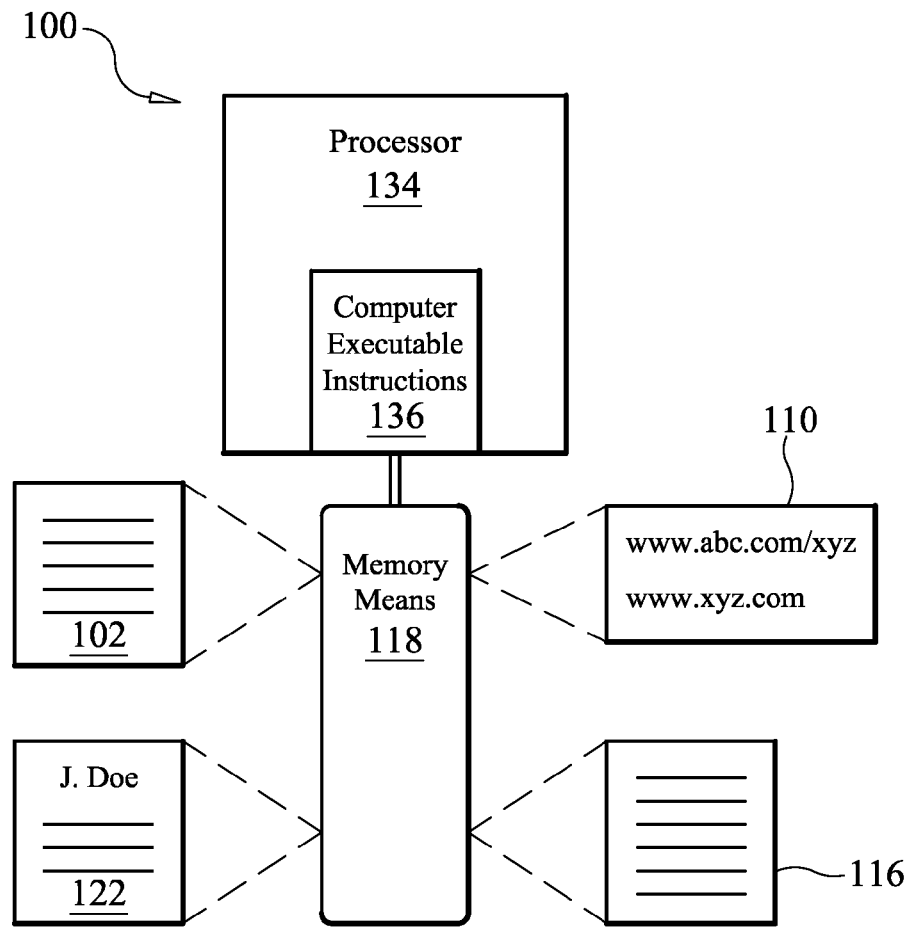
Figure 1C:
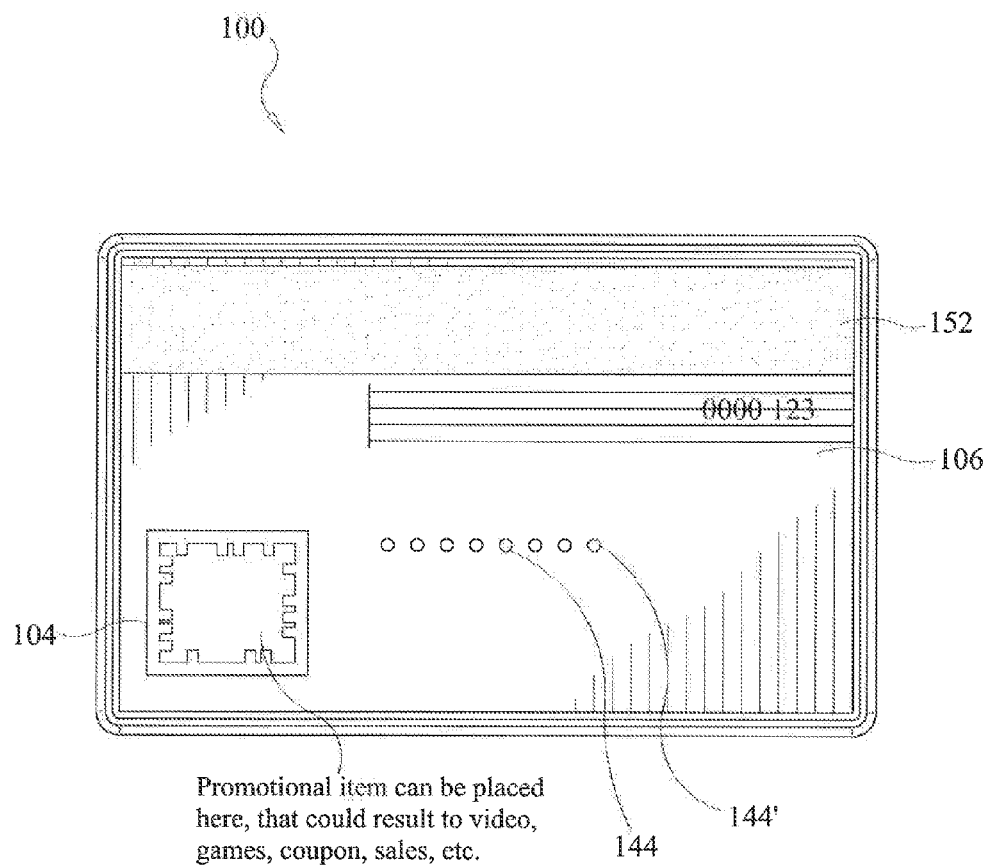

FIGS. 1A, 1B & 1C are exemplary embodiments of an apparatus 100 of the invention, i.e. an electronic payment card (ATM, debit and/or credit card) 100. Payment card 100, i.e. an electronic data card has cardholder's payment card information 102 electronically stored thereon; and also include an electronically coded frame 104 displayed on the payment card's exterior 106 that includes at least one or more hot corners 108, 108' with at least one or more hyperlinks 110, 110' or icons 112, 112' embedded within the coded frame 104, wherein the at least one or more hot corners 108, 108' with at least one or more hyperlinks 110, 110' or icons 112, 112' are activated for display when image capturing means 114 scans the coded frame 104 and the embedded hyperlinks 110, 110' or icons 112, 112' become visible for engagement. Upon activation, the at least one hyperlink 110 or icon 112 may be engaged for controlling multimedia content 116. Multimedia content 116 may include but is not limited to any one or more of the following: videos, identification verification information, bank verification information, payment card information 102, photographs, questions, games, promotions, coupons, coupon codes, bar codes, discounts, pricing, availability, locations, directions, television commercials, radio advertisements, print advertisements, movies, and movie trailers, that may be presented in audio, graphics, text, videos or any other format.

Payment card 100 is selected from the group of electronic devices consisting essentially of programmable smart cards, memory cards, and processor cards, with at least one memory means 118 positioned therein. Payment card information 102 as used herein includes any one or more of the following: payment card number 120, cardholder's information 122 (e.g. name 124 address, pre-approved status to participate in this system and method, date of birth, contact information, cardholder's photograph, authenticating security question(s), a secret code and the like), issuing bank information 126, cardholder's account information 128, and any other information that the issuing bank may deem significant enough to store on the payment card 102. Other data that may be stored thereon may include for instance cardholder's personal identification number 130 and chip 132, and the like.

Payment card 100 may or may not include a processor 134 positioned within. If it includes a processor 134, processor 134 may be any type of processor 134, such as, but not limited to, a central processing unit (CPU), a microprocessor, a video processor, a front end processor, a coprocessor, a single-core processor, a multi-core processor, as well as any known processor 134 that is used in the arts.

As shown in FIG. 1B, in some embodiments, embedded within the processor 134 are computer executable instructions 136 readable and executable by the card's at least one processor 134 where the computer executable instructions 136 are operative to perform the varied system and methods disclosed herein including but not limited to: accessing the card's chip 132 for retrieving the cardholder's pin 130; retrieving the cardholder's payment information 102 when communicating with a merchant's card reader 140 at the point-of-sale (POS) terminal 142; or retrieving multimedia content 116 pursuant to a scanned a coded frame 104 that includes at least one or more hot corners 108, 108', 108" with at least one embedded hyperlink 110 or icon 112 within, and the like. Computer executable instructions 136 may be loaded directly on the payment card's processor 134, or may be stored in payment card's memory means 118, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 136 may be any type of computer executable instructions 136, which may be in the form of a computer program, the program being composed in any suitable programming language or source code, such as C++, C, JAVA, JavaScript, HTML, XML, and other programming languages.

In some embodiments, payment card 100 includes at least one memory means 118 as exemplified in FIG. 1B. Such memory means 118 may include a hardware component, e.g. storage hardware, in electrical communication with at least one processor 134. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 118 may comprise of both hardware and software components.

Figure 2:
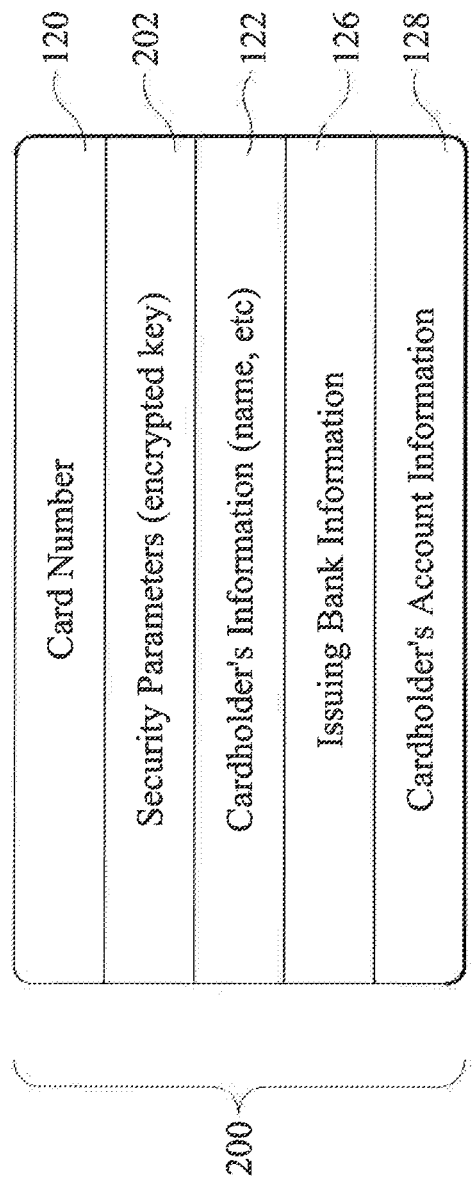
FIG. 2 is an exemplary embodiment of the data structures of the invention.

Memory means 118 may include any one or more of the following stored thereon: payment card information 102, and/or any other data structures 200 (as shown in FIG. 2), multimedia content 116, hyperlinks 110, 110', website addresses or Uniform Resource Locators (URLs), and the like. In some embodiments, at least one memory means 118 may be embedded within at least one processor 134 where the information stored therein is encrypted for privacy purposes. In other embodiments, the at least one memory means 118 is adapted with electrical contacts 144, 144' for establishing wired and/or wireless connectivity with external devices, e.g. a computer 314 and/or a card reader 140 via for example payment card's microchip 132 and/or at least one microprocessor 134 where the memory means 118 is embedded within.

In some embodiments, payment card 100 may optionally include a battery 146, which serves as a power source for the at least one processor 134 positioned therein. In some embodiment, payment card 100 is adapted with external electrical contacts 144, 144' for establishing wired and/or wireless connectivity to a card reader 140 or a charger, e.g. a docking station, and as such may not include a battery 146. In that event, processor 134 detects when the payment card 100 has been disconnected from an external power source and switches payment card's power source to an internal power source, such as the battery 146.

Referring back to FIG. 1A, payment card 100 may include a card number 120, which acts as a unique identifier for the payment card 100 and/or cardholder. Card number 120 may be assigned by a random number generating program, comprising of numerals, characters, alphanumeric characters or any other unique identifiers that are known and used in the arts. Prior to being issued to the cardholder, the payment card number 120 may be recorded by the issuing bank as another means of identifying the cardholder. Payment card 100 may also include other indicia of identification, e.g. the payment cardholder's name 124. In some embodiments, the cardholder's address may be stored within the payment card's memory means 118. Each payment card 100 has a validation date, i.e. an issue date 148, that corresponds to the date the payment card 100 is scheduled for being valid for presentment in financial transactions. Most payment cards 100 also include an expiration date 150, which corresponds to the date the payment card 100 expires and is no longer valid.

FIG. 2 illustrates, by way of example, collectively the data structures 200 stored within the payment card 100 according to an embodiment of the invention. Data structures 200 are retained within the electronic data card's memory means 118, which preferably provides sufficient processing resources to facilitate communication and maintain adequate security for the card 100. Data structures 200 include but are not limited to: payment card number 120, security parameters 202, payment card information 102, issuing bank's information 126 (e.g. contact information, authorized Automated Teller Machines ("ATMs")), cardholder's account information 128 and the like. Card number 120 may act as a unique identifier allowing the system to uniquely recognize and register each payment card 100 that has been assigned and issued to individual cardholders. Security parameters 202 may be provided, that may include an encrypted key(s) of military grade, and or security codes, biometric security features, and/or other security mechanisms for maintaining the confidentiality of the data structures 200 stored on the card 100.

Payment card information 102 may be stored thereon, and it will be understood that access to the payment card information 102 may be provided in a hierarchical form associated with security provisions to protect the confidentiality of the information stored on the payment card 100.

Issuing bank information 126 may include for example the bank's name, bank's contact information, issuing country for the payment card 100, type of payment card, e.g. VISA®, MASTERCARD®, AMERICAN EXPRESS®, DIS- COVER®, and the like or any other information that the issuing bank may deem significant enough to store on the payment card 102. Cardholder's account information 128 may contain banking information e.g. account number associated with the payment card 102, credit limits, account balances, available credit, the type of payment card, e.g. VISA®, MASTERCARD®, AMERICAN EXPRESS®, DISCOVER®, and the like.

Payment card 100 may include electrical contacts 144, 144' for making electrical contact with a card reader 140. In some embodiments, the payment card 100 includes a magnetic stripe 152 on the back of the payment card 100 encoded with payment card information 102. Accordingly, at a point of sale transaction, when the payment card 100 is swiped through the merchant's card reader 140, the application software 152 at the point-of-sale (POS) terminal 142 retrieves the payment card information 102 to consummate the financial transaction as are well known and employed in the arts. For example, the POS terminal 142 dials a stored telephone number (using a modem) to call for example the issuing bank or an acquirer, i.e. an organization that collects credit-authentication requests from merchants and provides the merchants with a payment guarantee. The acquirer receives the credit-card authentication request for the transaction, validates the transaction and the payment card information 102 stored on the card's magnetic stripe 152. Information being verified for the payment transaction includes but is not limited to: merchant's identification, valid card number 120, payment card's expiration date 150, credit-card limit, card usage and the like. Cardholder's personal identification number (PIN) 130 may also be validated as it may not exist on the payment card 100, but rather exist in an encrypted format in a database 106' that verifies the encrypted pin forwarded from the ATM machine also in an encrypted format to confirm a match. In an exemplary embodiment, if there is a match, the transaction is authorized.

In some embodiments, the payment card 100 incorporates smart card technology which relies on a chip 132 and a PIN 130, i.e. a global standard for inter-operation of integrated circuit cards with a computer chip that may be embedded in the payment card 100 or positioned on the card's exterior 106 requiring a PIN 130 that must be supplied by the cardholder for authenticating the payment transactions. Accordingly, when the cardholder wishes to pay for goods, the card is placed into a POS card reader 140 that is linked to the POS terminal 142 or a modified swipe-card reader 140 that accesses the chip 132 on the payment card 100. Once the payment card 100 has been verified as authentic, the customer enters a PIN 130, which is submitted to the chip 132 on the payment card 100 for verification. If both PINS 130, 130' match, the chip 132 tells the POS terminal 142 and likewise advises the POS terminal 142 if the PIN 130 was incorrect.

Systems & Methods

Figure 3A:
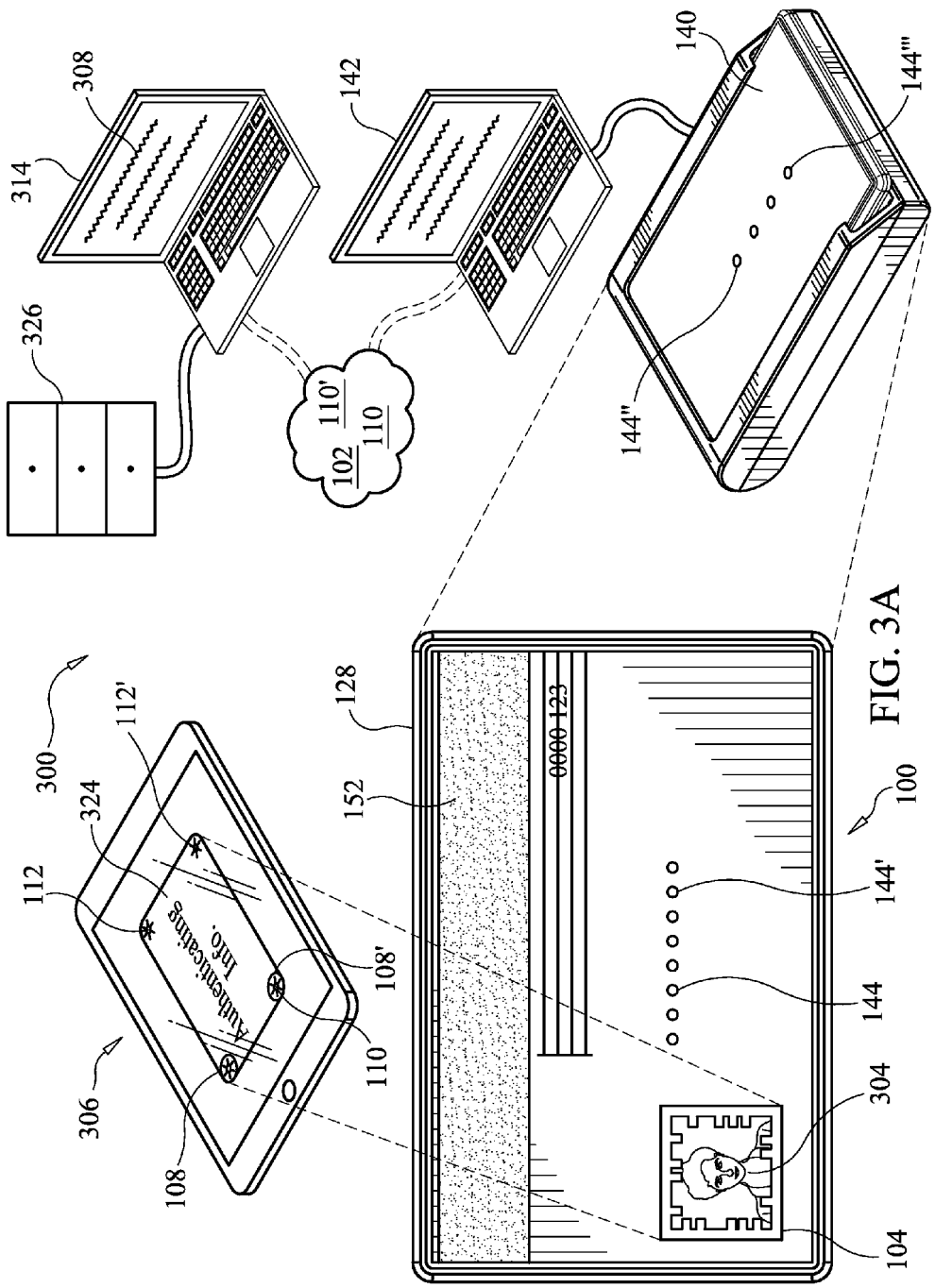
FIGS. 3A-3C show an example of the system of the invention.
Figure 3B:
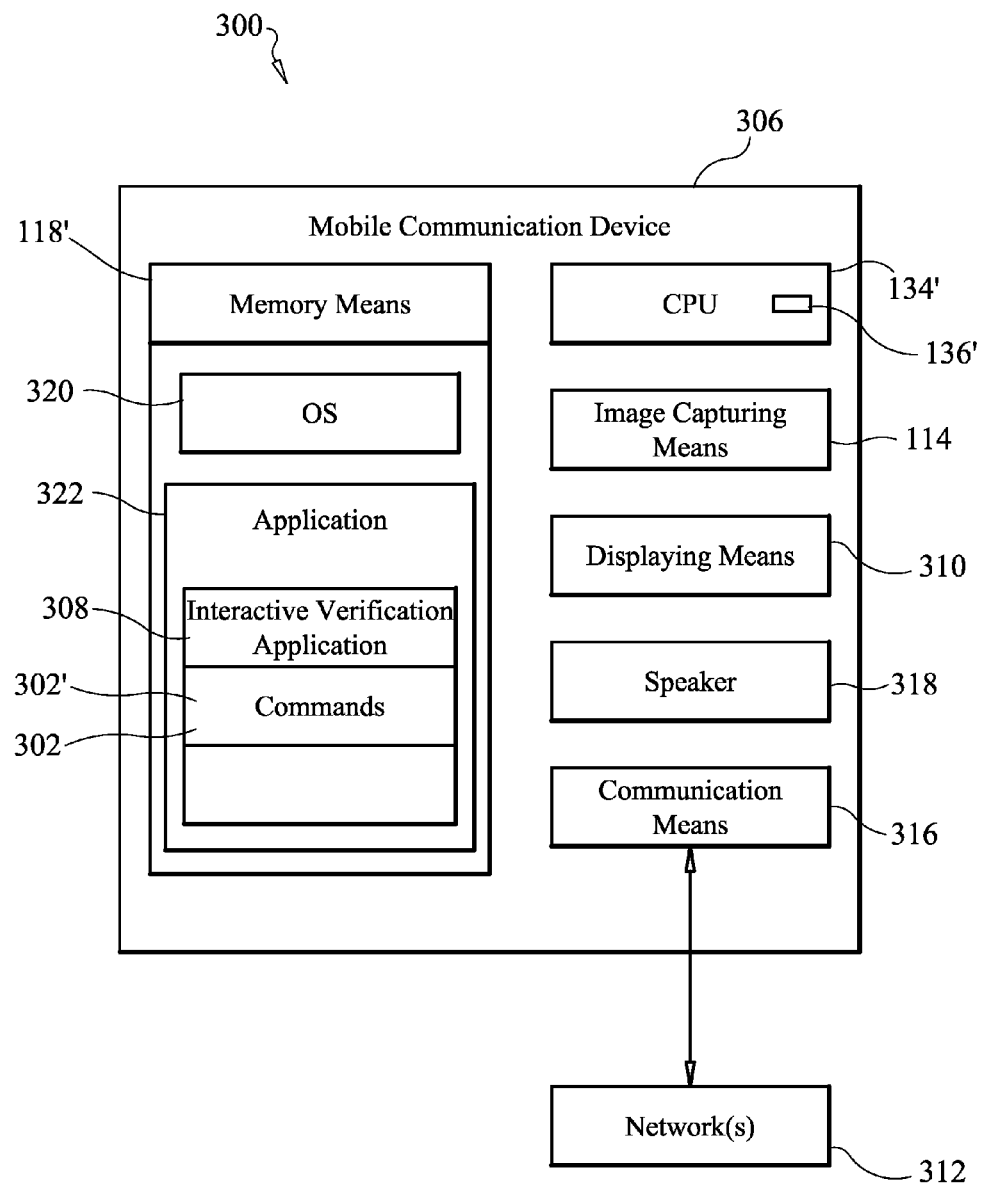
Figure 3C:
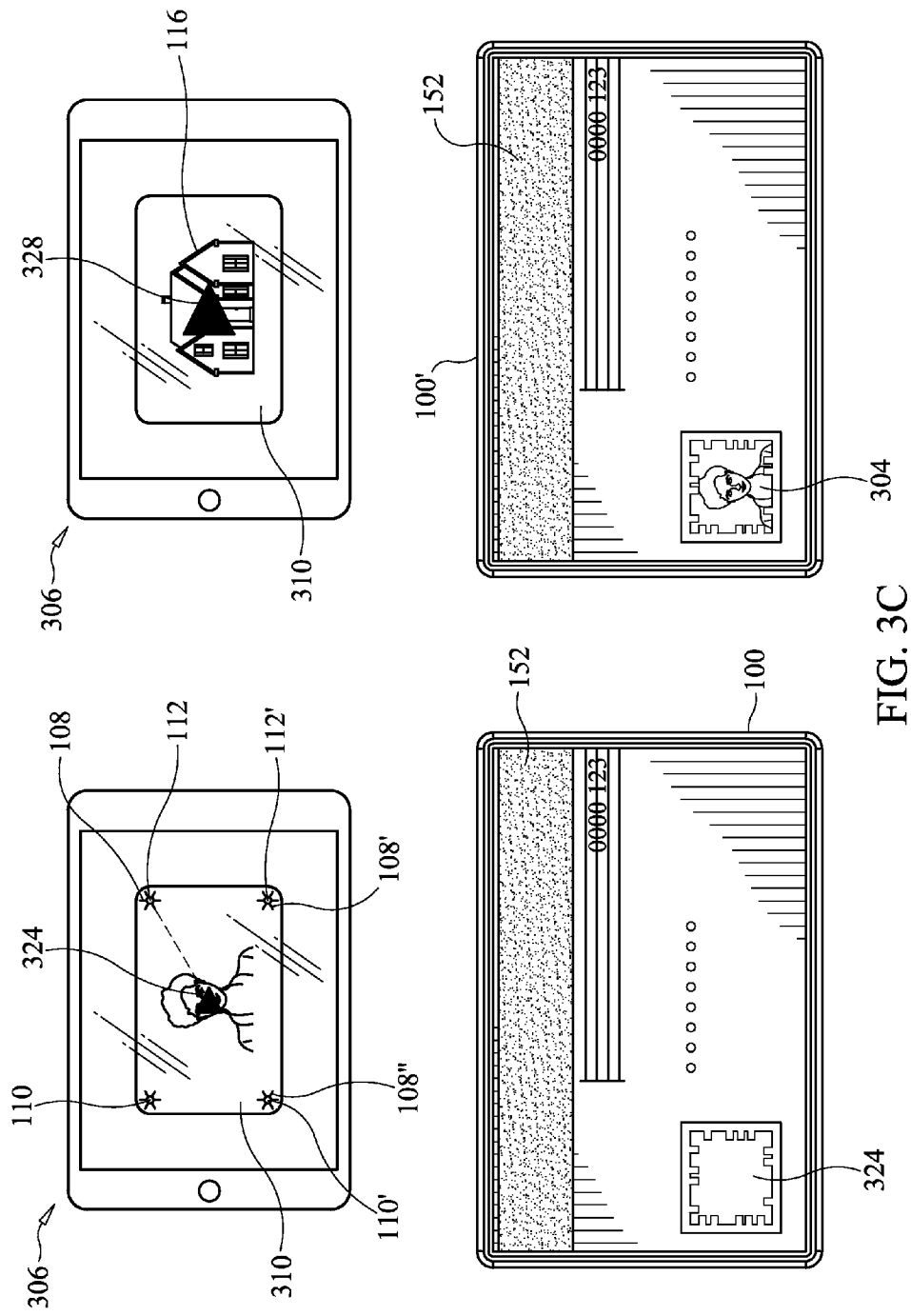

FIGS. 3A-3C are exemplary embodiments of the system 300 of the invention. System 300 comprises of the electronic payment card 100 with payment card information 102 electronically stored thereon with the coded frame 104 displayed on the payment card's exterior 106 that includes at least one hot corner 108 with at least one hyperlink 110 or icon 112 (as is well known and used in the arts) embedded within the coded frame 104, activated for display when image capturing means 114 scans the coded frame 104 and upon activation, the at least one hyperlink 110 or icon 112 may be engaged for controlling multimedia content 116 pursuant to a control command 302 associated with the at least one icon 112 or hyperlink 110 in the at least one hot corner 108. Some banking institutions may (or may not) include a coded image 304 within the coded frame 104 adding an additional level of complexity to their security measures. The coded image 304 may be a logo 304 of the bank, or a photograph 304 of the cardholder, sales information or other any other appropriate commercial image. As such, a fraudulent duplication necessitates that not only the coded image 304 within the coded frame 104 must be accurately duplicated but also the corresponding embedded hyperlinks 110, 110' and/or icons 112, 112' in order to access accurate undisplayed multimedia content 116 that remains a mystery, invisible until activated after being scanned by image capturing means 114 and engaged using the hyperlinks 110, 110' and/or icons 112, 112'.

System 300 also includes a networked communication device 306 (also referred to herein as "mobile device") as shown in FIG. 3B that comprises of a computer processor 134' comprising computer executable instructions 136' readable and executable by the computer processor 134' and configured for launching an interactive verification application program 308, programmed for controlling the multimedia content 116; the image capturing means 114; and displaying means 310 for displaying the at least one multimedia content 116.

Networked communication device 306 may be any type of electronic computerized communication device configured with means for communicating wirelessly and/or wired with other electronic computer devices, and includes but is not limited to, a computerized scanner, mobile communication devices, e.g. cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 312, local area network 312, wide area network 312, such as the Internet 312, or any other type of network device that may communicate over a network 312. Computer 314 as used herein includes but is not limited to a network enabled computer 314, cellular phones like the networked communication device 306 described herein, a laptop or personal digital assistant subject to wired/wireless connectivity, and configured with a computer processor 134.

Networked communication device 306 may include various other hardware components, e.g. memory means 118', and one or more communication means 316 and also software components like the interactive verification app 308. The networked communication device's central processor 134 may be programmed to activate the interactive verification app 308, e.g. running in background while the networked communication device 306 is powered on, for viewing multimedia contents 116, 116', which may be displayed on the mobile device's displaying means 310 in for example graphics, pictorial, video, audio, text format or any combination thereof.

In some embodiments, the interactive verification app 308 may have its own computer icon 112 or other visual indicator displayed on the networked communication device 306 for launching or providing access to the interactive verification app 308. When a merchant selects the respective interactive verification app's icon 112 (e.g. by touching a touchscreen, or selecting it using a pointing device, roller ball, arrow keys, or other controller), where upon selection, the computer central processor 134', launches the interactive verification app 308 and the processor 134', which is electronically connected to the displaying means 310, controls the displaying means 310 to display the interactive verification app 308 as launched on the at least one mobile device's displaying means 310. Once displayed the interactive verification app 308 is ready for use in scanning the coded frame 104 or the coded image 304 within the coded frame 104 on the payment card 100.

Networked communication device's one or more memory means 118' may be either electrically or mechanically connected to the at least one computer processor 134'. Information stored on the networked communication device's memory means 118' may be retrieved using its processor 134' and may be published by push notification on the mobile device's displaying means 310 or broadcasted over a speaker 318 using the type and configuration of speakers that are well known and used in the arts for cellular phones 304, 304'.

Networked communication device 306 is equipped with communication means 316, either electrically or mechanically connected to the central processor 134'. In the case of electronic connections, the electronic connections may be wired and/or wireless. In some embodiments, communication means 316 may be a wireless communication means 316, which employ short range wireless protocol, such as, but not limited to, a radio frequency transceiver, a radio frequency receiver, and/or a radio frequency transmitter for communicating over the Internet 312 to access for example issuing bank's websites, other designated URLs and their corresponding multimedia content 116. It is understood that each coded frame 104 is unique, even if the multimedia content 116 is not.

In embodiments where the wireless communication means 316 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 316 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 316 is operative to transmit or receive electronic communications, i.e. the captured at least one coded image 304, the coded frame 104, the multimedia content 116, electronic data, audio, videos, text, pictures, graphics and the like via a short range wireless protocol, such as, but not limited to, a radio frequency receiver, a radio frequency transmitter, or a radio frequency transceiver and to communicate and search for the appropriate hyperlink, websites, URLs and the like over the Internet 312.

Networked communication device 306 includes a computer processor 134', disposed within and in electronic communication with the memory means 118'. Computer processor 134' includes computer executable instructions 136' readable and executable by the at least one processor 134'. Computer executable instructions 136' are operative to perform all the necessary functions for the networked communication device 306, including but not limited to: automatically launching the interactive verification app 308, i.e. running a background service while the networked communication device 306 is powered on, and controlling multimedia content 116 corresponding to the coded frame 116 or at least one coded image 304 within the coded frame 116, which include at least one or more hot corners 108, 108', 108" with at least one embedded hyperlink 110 or icon 112 within, and the like. Computer executable instructions 136' may be loaded directly on the mobile device's processor 134, or may be stored in mobile device's memory means 118', that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like.

Interactive verification app 308, which may be stored in the mobile device's memory means 118' also comprises of computer executable instructions 136" readable and executable by the at least one processor 134', and is configured for performing any all the necessary functions for the system 100 and methods of the invention, which may include any one or more of the following: controlling multimedia content 116 corresponding to the coded frame 116 and/or the at least one coded image 304 within the coded frame 116, where the coded frame 116 includes at least one or more hot corners 108, 108', 108" with at least one embedded hyperlink 110 or icon 112 within, responsive to the control command 302 associated with the hyperlink 110 or icon 112 in the hot corner 118; activating the at least one or more hot corners 108, 108', 108" when the at least one coded image 304 within the coded frame 116 is scanned as shown in FIG. 3C. Interactive verification app 308 is also configured for playing the at least one multimedia content 116 for the coded frame 104 or the captured at least one coded image 304 within the coded frame 104 pursuant to a control command 302 associated with the at least one embedded icon 112 or hyperlink 110; receiving at least one control command 302 for activating the at least one multimedia content 116 within the coded frame 114 with full functionality for review and control when the multimedia content 116 is for instance displayed. Control command 302 include but are not limited to any one or more of the following: play, stop, fast-forward, rewind, pause, maximize viewing, minimize, end and cancel; retrieving directions related to the multimedia content 116 for the captured at least one coded image 304; displaying the directions as retrieved within the coded frame 116; retrieving the at least one multimedia content 116, e.g. a security questions, cardholder's account information 128, menu of items, in some embodiments a game, marketing promotions, commercials and the like, that it accomplishes by linking to a website using a designated URL; automatically starting a game upon retrieval of the multimedia content 116; providing for product purchases related to the coded image 304, e.g. mortgage or loan products with rebates and the like. The at least one control command 302' associated with the at least one embedded icon 112 includes any one of the following: display multimedia content 116, play audio for multimedia content 116, activate a game, display marketing promotion for featured product, display product details, locate stores, and generate directions, link to an electronic address and the like.

In some embodiments, as shown in FIG. 3C, where the payment card 100 does not include a coded image 304, the interactive verification app 308 is configured for controlling the multimedia content 116 corresponding to the at least one coded image 304 within the coded frame 116 by overlaying the designated display area 324 with the at least one embedded icon 112, which has an associated control command 302. If the payment card 100' includes a coded image 304, the interactive verification app 308 is configured for controlling the multimedia content 116 corresponding to the at least one coded image 304 within the coded frame 116 by overlaying the at least one coded image 304 with the at least one embedded icon 112, which has an associated control command 302.

Networked communication device 306 may include any kind of displaying means 310, such as, but not limited to: a liquid crystal display ("LCD") screen, a light emitting diode ("LED") display, touchpad or touch screen display, and/or any other means known in the arts for emitting a visually perceptible output. Mobile device's processor 134' is in electronic communication with its displaying means 310. In other embodiments, displaying means 310 is wirelessly connected to processor 134'. Displaying means 310 may include control means, such as, but not limited to, a touch screen, a stylus, and the like that may be used to also control or input values or interact with the multimedia content 116, e.g. security questions. In some embodiments, displaying means 310 may be electronically connected to a networked communication device 306 according to the hardware and software protocols that are known and used in the arts. Computer central processor 134 controls the mobile device's displaying means 310, which is configured for displaying the at least one or more coded advertising images 114, multimedia contents 116, 116' and the like.

Networked communication device 306 also includes software components that may be stored in the memory means 118'. Memory means 118' may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by networked communication device 306. Networked communication device 306 may also contain an input element for inputting data and an output element for displaying data.

Also stored on the memory means 118' may be an operating system 320, application manager 322, and the interactive verification app 308. Interactive verification app 308 may be an independent component or may be incorporated into the operating system 320. Interactive verification app 308 is a computer-executable component, readable and executable by the computer processor 134, wherein the interactive verification app 308 links to the Internet 312 to retrieve at least one or more multimedia contents 116, 116' to be displayed on the mobile device's displaying means 310. The multimedia contents 116, 116' may be in any format, e.g. audio, video, pictorial, text message, graphics, and as such is published or also broadcasted in any format on the networked communication device 306.

Application manager 322 comprises of computer-executable components that operate in the networked communication device 306 and may be implemented in a variety of ways. In one embodiment of the invention, application manager 322 may use one or more computer-executable components for interacting with interactive verification app 308. In another embodiment, interactive verification app 308 is incorporated in application manager 322 to receive information from the input element, to communicate with, and/or to control the operations of interactive verification app 308.

Interactive verification app 308 may comprise in part of a browser, such as for use on the networked communication device 306, or a similar browsing device. Interactive verification app 308 may be any type of software application, such as a standalone application designed to run on a mobile platform, such as a mobile device running an operating system 320, such as iOS™, Android™, Windows Mobile™, Blackberry™, and the like. Interactive verification app 308 may be operative for an iPhone, any other "smart phone," mobile device, cellular phone, PDA, GPS or any other networked communication device 306 capable of handling electronic transactions dealing with dynamic content, object, application, or software. In some embodiments, the interactive verification app 308 may be designed to run on a social network platform, such as FACEBOOK® or JUSTSYNC®, TWITTER® and the like. In some embodiments, interactive verification app 308 may reside on a server computer 314 and may be downloadable from the server computer 314, the server computer's electronic database 326 or otherwise reside in the networked communication device's local memory means 118'. For example, in one embodiment, the interactive verification app 308 may be on a networked communication device 306 (such as an iPhone, Blackberry, or other "smart phone") and the full-sized software program may be on a computer 314, where communications may occur over a network 312 or directly, either wired or wirelessly.

Referring back to FIGS. 3A & 3C, the networked communication device 306 may be used to scan the coded frame 104 and/or any coded image 304 within the coded frame 104 on the payment card 100 for verification of the user's identity. For example, a merchant may use image capturing means 114, e.g. a mobile device's camera, to scan or hover over the coded frame 104 and/or any coded image 304 activating the undisplayed, embedded at least one hyperlink 110 or icon 112. Once the coded frame 104 and/or the coded image 304 is scanned the at least one or more hot corners 108, 108', 108" with the at least one hyperlink 110 or icon 112 are activated and viewable to be engaged for controlling interactive multimedia content 116 pursuant to a control command 302 associated with the at least one icon 112 or hyperlink 110 in the at least one hot corner 108. In some embodiments, the control commands also become viewable and are displayed when the hot corners 108, 108', 108" or icons 112, 112' are activated. The activated at least one or more hot corners 108, 108', 108" or icons 112, 112' may pulsate, blink or displayed in a color contrast or animated to alert the user of the option to interact with the hot corners 108, 108', 108" and/or the icons 112, 112' by exploring one or more of the interactive control commands 130, 130' associated with the icons 112, 112'.

The icons 112, 112' or hyperlinks 110, 110' may be engaged on the networked communication device's displaying means 310 by overlaying the coded image 304 or a designated display area 324 within the coded frame 104 with at least one icon 112, which causes the interactive verification app 308 to retrieve the multimedia content 116 for display. The interactive multimedia content 116 may be stored on the payment card's memory means 118, the computer server's 326 or linked to a website or other URL, where the multimedia content 116 may remain dynamic. Multimedia content 116 includes cardholder's information 122 such that if the payment card 100 is a fake, since the cardholder's information 122 that may be stored thereon is coded and only viewable when scanned by a third-party merchant's communication device 306, the merchant is able to verify the information and quickly determine whether the payment card 100 and/or the cardholder's authorization to make the payment transaction. Exemplary cardholder's information 122 may include but is not limited to cardholder's photograph 306, authenticating security questions, a secret code for large purchase and the like. For the security questions, such security questions may comprise of a randomly generated sequence based on the cardholder's known information with the issuing bank, whereby the questions being posed are dynamic and may differ every time.

In some embodiments, once the networked communication device's image capturing means 114 hovers over the coded frame 104, it causes the application software ("app") 130 to automatically display the multimedia content 116, that may include for example one or more stored promotional videos, games, coupons, sales events, etc. that are associated with the coded frame 104. In some embodiments of the invention, the app 308 includes virtual radio buttons 328, 328' that may allow the user to further manipulate the image, e.g. play, rewind, fast forward, scroll text, or stop the video 116 being played. As such, the app 308 makes a determination of whether a corresponding multimedia content 116 exists; conducts at least one electronic computerized search for the corresponding multimedia content 116 to the extent that the multimedia content 116 exists; retrieve the multimedia content 116 for the coded frame 104 and/or the coded image 304; and display the multimedia content 116 on the mobile device's displaying means 114.

In yet another embodiment, authentication using the coded frame 104 and/or coded image 304 within the coded frame 104 may be used for authenticating user's authority for online purchases. For example, cardholder may use his/her own mobile phone or any other scanning devices with image capturing means 114 to complete his or her purchase through a software platform, e.g. ReelSign™ (OPAS) Online Purchase Approval Signatory platform, whereby when the cardholder scans the coded frame 104 (or the coded frame 104 with the coded image 304) on his/her payment card 100, it automatically retrieves multimedia content 116, e.g. an interactive validating security question(s) posed by the issuing bank for the cardholder to answer. It is understood that the question(s) would involve answers known only by the cardholder and/or a chosen few, but not a stranger or thief. Once the cardholder answers the question, the interactive verification app 308 communicates the response to the networked communication device's processor 134 that controls the communication means for transmitting the answer to the issuing bank or the acquirer instantly in realtime, where the issuing bank or the acquirer using the interactive verification application software 308 immediately confirms the answer. If the answer is correct, the online purchase transaction is approved, if incorrect, the cardholder may have another opportunity to provide a correct answer. According to the system and methods of the invention, alternate questions posed may differ from the previous question(s) asked. If the cardholder still answers incorrectly, the payment card 100 may be canceled or suspended immediately as a potential fraudulent card transaction.

As seen in FIG. 3A, system 300 further comprises of a card reader 140 connected to a computer 314, wherein the card reader 140 is configured for reading the payment card 100 for verifying the cardholder's pre-approval for payment transactions with the payment card 100. Card reader 140 describes an electronic device for scanning and reading electronic data cards, e.g. the payment card 100 via the exemplary magnetic stripe 152 or chip 132 and PIN 130, to obtain electronic data stored thereon as are well known and used in the arts. Card reader 140 is connected to a computer 314 either wirelessly or wired, wherein card reader 140 is configured for scanning and reading any one or more of the following: the payment card number 120, the payment card information 102, and/or any other component of the data structures 200 stored thereon. Card reader 140 is further configured for reading or writing to the payment card 100. Card reader 140 as exemplified herein may be adapted with electrical contacts 144", 144''' for establishing wired and/or wireless connectivity to payment cards 100, 100', 100" and/or the computer 314 and transmits that payment card number 120 to the computer 314, where the payment card 100 is authenticated as a validly issued card. In some embodiments, a wireless connection may be established, wherein communication access is established with the computer 314 or the payment card 100 in response to proximity or manual activation of the card reader 140. Card reader 140 may also be integrated within a computer 314 (e.g. with a slot for wired card connectivity), an external device (e.g., USB connection to a small housing), or be integrated into other devices.

Methods

Figure 4:
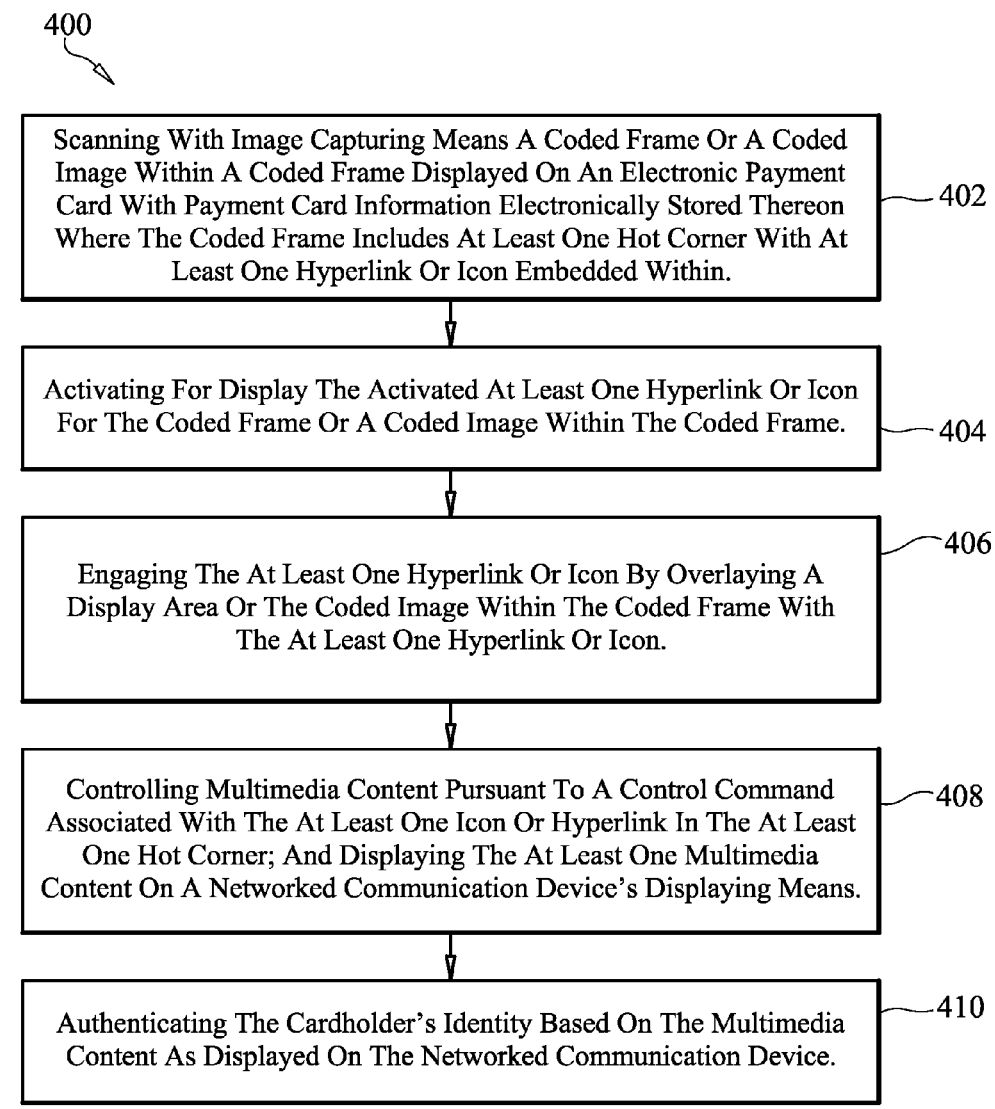
FIG. 4 shows an example of the method of the invention.

FIG. 4 shows an example of an exemplary method 400 according to another embodiment. Method 400 comprises of scanning with the networked communication device's image capturing means 114 a coded frame 104, or a coded image 304 within a coded frame 104, displayed on an electronic payment card 100 with payment card information 102 electronically stored thereon, and wherein the coded frame 104 includes at least one or more hot corners 108, 108', 108" with at least one hyperlink 110 or icon 112 embedded within (step 402).

Method 400 further comprises activating for display the activated at least one hyperlink 110 or icon 112 for the coded frame 104 or a coded image 304 within the coded frame 104 (step 404); engaging the at least one hyperlink 110 or icon 112 by overlaying a display area 324 if the coded frame 104 does not include a coded image 304 with the at least one hyperlink 110 or icon 112 or overlaying the coded image 304 within the coded frame 104 with the at least one hyperlink 110 or icon 112 (step 406). By overlaying the display area 324 or the coded image 304 the at least one hyperlink 110 or icon 112 are activated and may pulsate, blink or displayed in a color contrast or animated to alert the user of the option to interact with the hot corners 108, 108', 108" and/or the icons 112, 112' by exploring one or more of the interactive control commands 130, 130' associated with the icons 112, 112'. The interactive verification app 308 then retrieves the multimedia content 116 from any one or more of the following sources: electronic database 326, the payment card's memory means 118, hyperlinking to a Uniform Resource Locator.

Method 400 further comprises controlling the multimedia content 116 pursuant to a control command 302 associated with the at least one icon 112 or hyperlink 110 in the at least one hot corner 108 (step 408); and displaying the at least one multimedia content 116 on a networked communication device's displaying means 310 (step 410). The multimedia content 116 includes any one or more of the following: videos, identification verification information, bank verification information, payment card information 102, photographs, questions, games, promotions, coupons, coupon codes, bar codes, discounts, pricing, availability, locations, directions, television commercials, radio advertisements, print advertisements, movies, and movie trailers that may be presented in various formats, i.e. audio, video, pictorial, graphics, text or any combination thereof.

Once the multimedia content 116 is displayed on the networked communication device's displaying means 310, the cardholder's identity may be authenticated based on the multimedia content 116 as displayed on the networked communication device. For instance the multimedia content 116 may include security questions or a photograph that may be used to verify the cardholder's identity. The multimedia content 116 may be displayed within the coded frame 104 or in some embodiments is not confined to the coded frame 104 as it is displayed on the displaying means 310. In either event, the multimedia content 116 may be controlled with full functionality for review and control using the control command 302 associated with the at least one embedded icon 112 or hyperlink 110 that has been activated and includes any one of the following: display multimedia content 116, display promotions for featured product, display product details, locate stores, and generate directions. Control command 302 for displaying the at least one multimedia content include but are not limited to any one or more of the following: play, stop, fast-forward, scroll text, rewind, pause, maximize viewing, minimize, end and cancel.

Hardware and Operating Environment

This section provides an overview of example hardware and the operating environments in conjunction with which embodiments of the inventive subject matter can be implemented.

A software program may be launched from a computer readable medium in computer-based systems 100-300 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
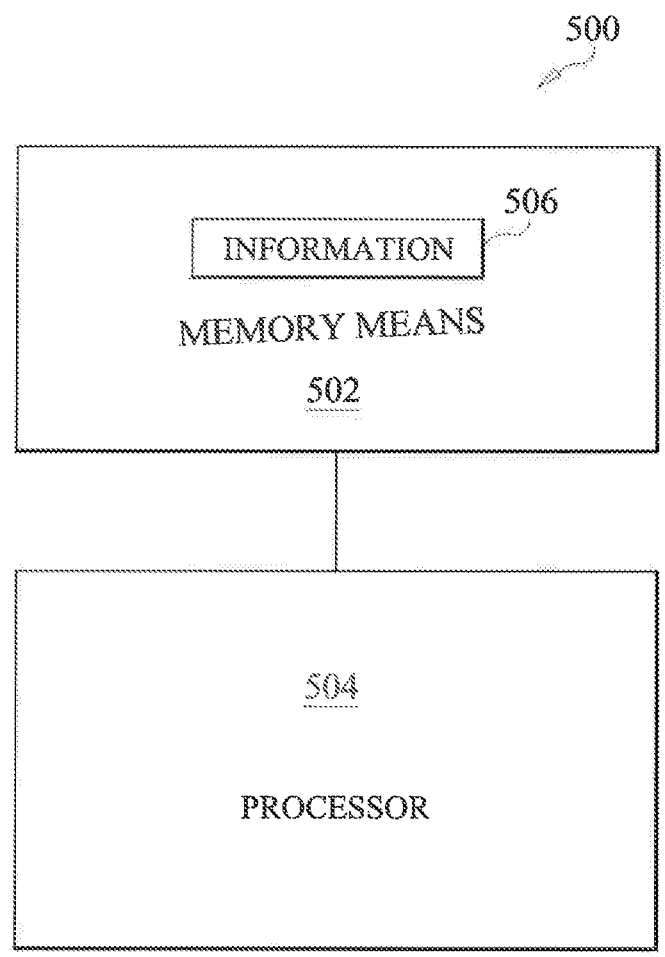
FIG. 5 is a block diagram representing an apparatus according to various embodiments.

FIG. 5 is a block diagram representing an apparatus 500 according to various embodiments. Such embodiments may comprise a computer, a memory system, a magnetic or optical disk, some other storage device, or any type of electronic device or system. The apparatus 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both) which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus comprising of:
    an electronic payment card with payment card information electronically stored thereon; and
    a coded frame displayed on the electronic payment card that includes at least one hyperlink or icon embedded within the coded frame, activated for display on a networked communication device when the networked communication device's image capturing means scans the coded frame, and upon activation of the at least one hyperlink or icon, the at least one hyperlink or icon is engaged for controlling multimedia content as displayed on the networked communication device.

2. The apparatus of claim 1, wherein the at least one multimedia content includes any one or more of the following: videos, identification verification information, bank verification information, questions, text, graphics, and audio content.

3. The apparatus of claim 1, wherein at least one control command associated with the at least one at least one hyperlink or icon includes any one of the following: display multimedia content, display promotions for a featured product, display product details, locate stores, locate banks, and generate directions.

4. The apparatus of claim 1, wherein an interactive verification application is further configured for displaying the at least one multimedia content within the coded frame with full functionality for review and control.

5. The apparatus of claim 1, further comprising a chip and pin stored on the electronic payment card.

6. A system comprising:
    an electronic payment card with payment card information electronically stored thereon with a coded frame displayed on the electronic payment card that includes at least one hyperlink or icon embedded within the coded frame, activated for display on a networked communication device when the networked communication device's image capturing means scans the coded frame, and upon activation the at least one hyperlink or icon is engaged for controlling multimedia content as displayed on the networked communication device; and
    the networked communication device that comprises:
        a computer processor that includes computer executable instructions executable by the computer processor and configured for launching an interactive verification application program, programmed for controlling the multimedia content;
        the image capturing means; and
        displaying means for displaying the at least one multimedia content.

7. The system of claim 6, wherein the at least one multimedia content includes any one or more of the following: videos, identification verification information, bank verification information, payment card information, photographs, questions, games, promotions, coupons, coupon codes, bar codes, discounts, pricing, availability, locations, directions, television commercials, radio advertisements, print advertisements, movies, and movie trailers.

8. The system of claim 6, wherein at least one control command associated with the at least one embedded icon includes any one of the following: display multimedia content, display promotions for featured product, display product details, locate stores, and generate directions.

9. The system of claim 6, wherein the interactive verification application is further configured for displaying the at least one multimedia content within the coded frame with full functionality for review and control.

10. The system of claim 9, wherein the at least one control command for displaying the at least one multimedia content includes but is not limited to any one or more of the following: play, stop, fast-forward, rewind, pause, maximize viewing, minimize, end and cancel.

11. The system of claim 6, wherein the interactive verification app is further configured for retrieving directions related to the multimedia content for the captured at least one coded advertising image.

12. The system of claim 6, wherein the interactive verification app is further configured for displaying the directions within the coded frame.

13. The system of claim 6, wherein the interactive verification app is further configured for retrieving the at least one multimedia content by linking to a website via its web address.

14. A method comprising:
using at least one processor of a networked communication device, to access and execute an interactive verification application program comprising of computer executable instructions, said method comprising the steps of;
scanning with a networked communication device's image capturing means a coded frame or a coded image within a coded frame displayed on an electronic payment card with payment card information electronically stored thereon where the coded frame includes at least one hyperlink or icon embedded within;
activating for display on the networked communication device the activated at least one hyperlink or icon for the coded frame or a coded image within the coded frame;
engaging the at least one hyperlink or icon by overlaying a display area or the coded image within the coded frame with the at least one hyperlink or icon;
controlling multimedia content pursuant to a control command associated with the at least one icon or hyperlink; and
displaying the at least one multimedia content on the networked communication device's displaying means.

15. The method of claim 14, further comprising authenticating the cardholder's identity based on the multimedia content as displayed on the networked communication device.

16. The method of claim 14, wherein at least one control command associated with the at least one embedded icon includes any one of the following: display multimedia content, display promotions for featured product, display product details, locate stores, and generate directions.

17. The method of claim 14, further comprising displaying the at least one multimedia content within the coded frame with full functionality for review and control.

18. The method of claim 14, wherein the at least one control command for displaying the at least one multimedia content includes but is not limited to any one or more of the following: play, stop, fast-forward, rewind, pause, maximize viewing, minimize, end and cancel.

19. The method of claim 14, further comprising retrieving multimedia content for any one or more of the following: electronic database, the payment card's memory means, hyperlinking to a Uniform Resource Locator.

20. The method of claim 14, wherein the at least one multimedia content includes any one or more of the following: videos, identification verification information, bank verification information, payment card information, photographs, questions, games, promotions, coupons, coupon codes, bar codes, discounts, pricing, availability, locations, directions, television commercials, radio advertisements, print advertisements, movies, and movie trailers.

* * * * *